United States Patent
Tahara et al.

(10) Patent No.: US 7,740,990 B2
(45) Date of Patent: Jun. 22, 2010

(54) SEPARATOR MATERIAL FOR SOLID POLYMER FUEL CELL AND PROCESS FOR PRODUCING THE SAME

(75) Inventors: Tomonori Tahara, Tokyo (JP); Nobuyuki Hirano, Tokyo (JP)

(73) Assignee: Tokai Carbon Co., Ltd., Tokyo (JP)

( * ) Notice: Subject to any disclaimer, the term of this patent is extended or adjusted under 35 U.S.C. 154(b) by 148 days.

(21) Appl. No.: 11/667,030

(22) PCT Filed: Nov. 4, 2005

(86) PCT No.: PCT/JP2005/020658
§ 371 (c)(1),
(2), (4) Date: Oct. 22, 2007

(87) PCT Pub. No.: WO2006/049319
PCT Pub. Date: May 11, 2006

(65) Prior Publication Data
US 2008/0111112 A1 May 15, 2008

(30) Foreign Application Priority Data
Nov. 8, 2004 (JP) .............................. 2004-323257

(51) Int. Cl.
*H01M 8/02* (2006.01)
*H01B 1/24* (2006.01)
*C08J 5/00* (2006.01)

(52) U.S. Cl. ................. 429/520; 429/521; 252/511; 264/320; 264/331.11

(58) Field of Classification Search ................. 264/294, 264/320, 331.11; 429/34; 252/511
See application file for complete search history.

(56) References Cited

U.S. PATENT DOCUMENTS

| 7,172,830 | B2 * | 2/2007 | Mizuno | ................. | 429/34 |
| 2002/0180088 | A1 * | 12/2002 | Hashiguchi et al. | ..... | 264/320 X |
| 2005/0142413 | A1 * | 6/2005 | Kimura et al. | ................. | 429/34 |
| 2006/0060824 | A1 * | 3/2006 | Yasumura et al. | ......... | 429/34 X |

\* cited by examiner

*Primary Examiner*—Stephen J. Kalafut
(74) *Attorney, Agent, or Firm*—Flynn, Thiel, Boutell & Tanis, P.C.

(57) ABSTRACT

A separator material suitable for a polymer electrolyte fuel cell and a method of producing the same. The separator material exhibiting gas impermeability, strength, dimensional stability during long-term use, and only a small degree of dissolution of organic substances which hinder the cell reaction. The separator material includes a graphite/cured resin molded product produced by binding a graphite powder using a mixed resin prepared by mixing an epoxy resin with a specific epoxy equivalent and a phenolic resin with a specific hydroxyl equivalent at a specific equivalent ratio and adding an imidazole compound without an amino group as a curing accelerator. The graphite/cured resin molded product has, when immersed in hot water at 90° C., a water absorption elongation percentage after 500 hours of immersion of a specific value or less and an amount of ammonium ions dissolved and an amount of TOC dissolved after 50 hours of immersion of specific values or less. The method of producing the separator material includes preforming a molding powder obtained by grinding a kneaded product of a mixed resin and a graphite powder to prepare a preform, and thermocompression-molding the preform in a mold.

4 Claims, 1 Drawing Sheet

SEPARATOR MATERIAL FOR SOLID POLYMER FUEL CELL AND PROCESS FOR PRODUCING THE SAME

TECHNICAL FIELD

The present invention relates to a polymer electrolyte fuel cell separator material formed of a graphite/cured resin molded product, and a process of producing the same.

BACKGROUND ART

A fuel cell directly converts the chemical energy of fuel into electric energy at a high conversion efficiency. In particular, a polymer electrolyte fuel cell can produce high output at a low temperature in comparison with a phosphoric acid fuel cell and the like. Therefore, the polymer electrolyte fuel cell is expected to be a small portable power supply such as an automotive power supply.

The polymer electrolyte fuel cell includes a stack formed by stacking single cells, two charge collectors provided outside the stack, and the like, each of the single cells including an electrolyte membrane formed of a polymer ion-exchange membrane such as a fluororesin ion-exchange membrane having a sulfonic acid group, catalytic electrodes supporting a catalyst such as platinum and provided on either side of the electrolyte membrane, separators provided with grooves used as gas passages for supplying a fuel gas such as hydrogen or an oxidant gas such as oxygen or air to the electrodes, and the like.

As shown in FIG. 1, the single cell includes a pair of electrodes 3 and 4 (cathode 3 and anode 4) disposed on either side of a polymer electrolyte membrane 5 formed of a fluororesin ion-exchange membrane, separators 1 formed of a dense carbon material and dosposed with the electrodes 3 and 4 interposed in between, and sealing materials 6 provided on the end of the separators in parallel with gas grooves. The electrodes 3 and 4 are formed of a porous body formed of carbon short fibers supporting a catalyst such as platinum, a product obtained by binding carbon black supporting a catalyst using a resin, or the like.

A number of linear or grid-like grooves 2 are formed in the separator 1. The space formed between the groove 2 and the cathode 3 is used as a passage for an oxidant gas (oxygen-containing gas such as air), and the space formed between the groove 2 and the anode 4 is used as a passage for a fuel gas (e.g. hydrogen gas or mixed gas containing hydrogen as the main component). A current is caused to flow between the electrodes by utilizing the following electrochemical reactions which occur when the fuel gas and the oxidant gas contact the electrodes. A cell stack is assembled by stacking several tens to several hundreds of single cells.

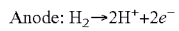

Anode: $H_2 \rightarrow 2H^+ + 2e^-$

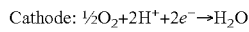

Cathode: $\frac{1}{2}O_2 + 2H^+ + 2e^- \rightarrow H_2O$

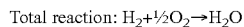

Total reaction: $H_2 + \frac{1}{2}O_2 \rightarrow H_2O$

Therefore, since it is necessary to completely separately supply the fuel gas and the oxidant gas to the electrodes, the separator must exhibit high gas impermeability. Moreover, since it is effective to reduce the internal resistance of the cell in order to increase power generation efficiency, the separator is required to have a reduced thickness and exhibit high conductivity.

In order to improve the cell performance, it is important to prevent an increase in contact resistance between the separator and the electrode and prevent a leakage of gas between or from the single cells by assembling the stack so that the single cells closely adhere and maintain an excellent contact state during power generation. Specifically, the separator material is required to exhibit high strength so that breakage or deficiency does not occur during assembly, and to exhibit sufficient strength at a cell operating temperature (about 80 to 120° C.). Moreover, the separator material is required to exhibit high moisture resistance so that a dimensional change due to moisture absorption in air does not occur.

A carbon material is generally used as the separator material for which the above properties are required. A carbon/cured resin molded product is suitably used as the separator material which is produced by binding a carbon powder such as graphite using a thermosetting resin as a binder and molding the resulting product.

For example, JP-A-2000-021421 discloses a polymer electrolyte fuel cell separator member and a method of producing the same, wherein the separator member is formed of a graphite-cured resin molded product which is a plate-shaped molded product containing 60 to 85 wt % of a graphite powder having a particle size distribution with an average particle diameter of 50 μm or less and a maximum particle diameter of 100 μm or less, and 15 to 40 wt % of a thermosetting resin, and has a resistivity in the plane direction of $300 \times 10^{-4}$ ohm·cm or less, a ratio of the resistivity in the thickness direction to the resistivity in the plane direction of 7 or less, and a flexural strength of 300 kgf/cm² or more.

JP-A-2000-243409 discloses a polymer electrolyte fuel cell separator member and a method of producing the same, wherein the separator member is formed of a carbon-cured resin molded product containing 40 to 90 wt % of a carbon powder and 10 to 60 wt % of a thermosetting resin and having a flexural strength at room temperature of 30 MPa or more and a flexural strength decrease rate from room temperature to 100° C. of 30% or less.

JP-A-2004-127646 proposes a method of producing a polymer electrolyte fuel cell separator member, the method including mixing a phenolic resin solution, of which the cured product exhibits a saturated water absorption of 3% or less, and a graphite powder so that the resin solid content is 10 to 25 wt % and the graphite powder is 75 to 90 wt %, kneading the mixture, drying and grinding the kneaded product, filling a mold with the ground particles, and thermocompression-molding the ground particles. This patent document describes that a separator which is warped to only a small extent and shows an increase in electric resistance due to water absorption to only a small extent can be produced by using a phenolic resin with a low water absorption.

As a resin molding material suitable for fuel cell separators and the like, JP-A-2001-261935 discloses an epoxy resin molding material containing an o-cresol novolak epoxy resin, a bisphenol A epoxy resin, and artificial graphite as the essential components, and JP-A-2002-083609 discloses a fuel cell separator composition containing a graphite powder, an epoxy resin binder, and a curing accelerator, wherein the graphite powder is mixed in an amount of 5 to 15 times the weight of the epoxy resin binder, the epoxy resin binder contains an epoxy resin and an epoxy resin curing agent, and the epoxy resin binder has a viscosity of 0.01 to 0.5 Pa·s at 150° C. and has a viscosity of 3 Pa·s or more or is solid at 25° C.

DISCLOSURE OF THE INVENTION

A thermosetting resin used as the binder is required to exhibit heat resistance, corrosion resistance, strength, and the like. A phenolic resin is suitably used as the binder due to low cost. However, since the phenolic resin produces water of condensation during curing, the condensation water partially remains in the cured resin molded product to impair the texture. Therefore, it is difficult to form a material texture with high gas impermeability.

When using a novolac phenolic resin, since hexamine (hexamethylenetetramine) is generally used as a curing agent, an ammonia gas is produced during a curing reaction as a decomposition gas from hexamine and partially remains in the cured resin molded product. As a result, a small amount of ammonia remains in the graphite/cured resin molded product.

Since the polymer electrolyte fuel cell is exposed to a wet environment during operation due to water produced by gas humidification or cell reaction, cooling water, and the like, ammonia remaining in the separator is dissolved into the cell as ammonium ions to hinder the movement of protons in the electrolyte membrane or decrease the catalytic function of the electrode, thereby causing the cell performance to deteriorate.

If the amount of total organic carbon (TOC) (organic substance) dissolved is increased, organic carbon covers the surface of the catalyst which promotes the cell reaction to decrease the catalytic activity, or adheres to the electrolyte membrane to contaminate the electrolyte membrane, thereby causing a change in the water retention of the electrolyte membrane to hinder the movement of protons.

Moreover, the novolac phenolic resin exhibits a high water absorption elongation percentage in hot water at 90° C. which simulates the cell operation environment. As a result, nonuniform elongation occurs in the separator, whereby cracks or breakage occur. In particular, if phenolic hydroxyl groups remain in the cured resin molded product, the phenolic hydroxyl groups promote water absorption and elongation. Moreover, when adding ethylene glycol to the cooling water as an antifreeze, the elongation percentage may be further increased due to liquid absorption of ethylene glycol.

When using a phosphorus-based curing accelerator such as triphenyl phosphine, moisture resistance (particularly when immersed in hot water) is decreased. Moreover, dissolution of organic substance is increased.

Specifically, the separator material for the polymer electrolyte fuel cell is required to exhibit a small degree of dissolution of ammonia and organic substances which cause the cell performance to deteriorate, a low water absorption elongation percentage, and the like in addition to generally-required properties such as excellent gas impermeability, low electric resistance, and high mechanical strength.

The inventors of the present invention have conducted extensive studies on a method of improving the properties of the separator material, and studied the resin properties and the properties and optimum combination of the curing agent and the curing accelerator. As a result, the inventors have found that a separator material can be provided with excellent properties by using a phenol novolac epoxy resin or a cresol novolac epoxy resin and a novolac phenolic resin (curing agent), specifying the epoxy equivalent of the epoxy resin, the hydroxyl equivalent of the phenolic resin, and the equivalent ratio, and using an imidazole compound without an amino group as the curing accelerator.

Specifically, an object of the present invention is to provide a polymer electrolyte fuel cell separator material which exhibits properties required for the separator material such as gas impermeability, strength, electric conductivity, and corrosion resistance, exhibits high dimensional stability during long-term use, shows a small degree of dissolution of organic substances which hinder the cell reaction, shows a small degree of deterioration in properties such as a decrease in strength and an increase in electric resistance, and allows stable long-term power generation, and a method of producing the same.

In order to achieve the above object, the present invention provides a polymer electrolyte fuel cell separator material comprising a graphite/cured resin molded product produced by binding a graphite powder using a mixed resin as a binder, the mixed resin being prepared by mixing a phenol novolac epoxy resin or a cresol novolac epoxy resin having an epoxy equivalent of 170 to 250 g/eq and a novolac phenolic resin having a hydroxyl equivalent of 120 to 200 g/eq so that an equivalent ratio by weight of epoxy groups to phenolic hydroxyl groups is 0.5 to 1.5, and adding an imidazole compound without an amino group to the mixture as a curing accelerator in an amount of 0.001 to 2.0 wt %, the separator material having, when immersed in hot water at 90° C., (1) a water absorption elongation percentage after 500 hours of immersion of 0.10% or less, (2) an amount of ammonium ions dissolved after 50 hours of immersion of 2 µg/g or less, and (3) an amount of total organic carbon (TOC) dissolved after 50 hours of immersion of 50 µg/g or less.

A method of producing a polymer electrolyte fuel cell separator material according to the present invention comprises mixing a phenol novolac epoxy resin or a cresol novolac epoxy resin having an epoxy equivalent of 170 to 250 g/eq and a novolac phenolic resin having a hydroxyl equivalent of 120 to 200 g/eq so that an equivalent ratio by weight of epoxy groups to phenolic hydroxyl groups is 0.5 to 1.5, adding an imidazole compound without an amino group to the mixture in an amount of 0.001 to 2.0 wt %, dissolving the resulting mixture in an organic solvent, kneading the mixed resin solution and a graphite powder, removing the organic solvent by volatilization, grinding the kneaded product to obtain a molding powder, filling a preforming mold with the molding powder, providing an upper mold and preforming the molding powder at a pressure of 1 to 10 MPa to obtain a preform, inserting the preform into a mold, and thermocompression-molding the preform at a pressure of 20 to 50 MPa and a temperature of 150 to 250° C.

In the above polymer electrolyte fuel cell separator material and the method of producing the same, it is preferable that a weight ratio of a resin solid content of the mixed resin and the graphite powder be 10:90 to 35:65.

BEST MODE FOR CARRYING OUT THE INVENTION

Figure 1:
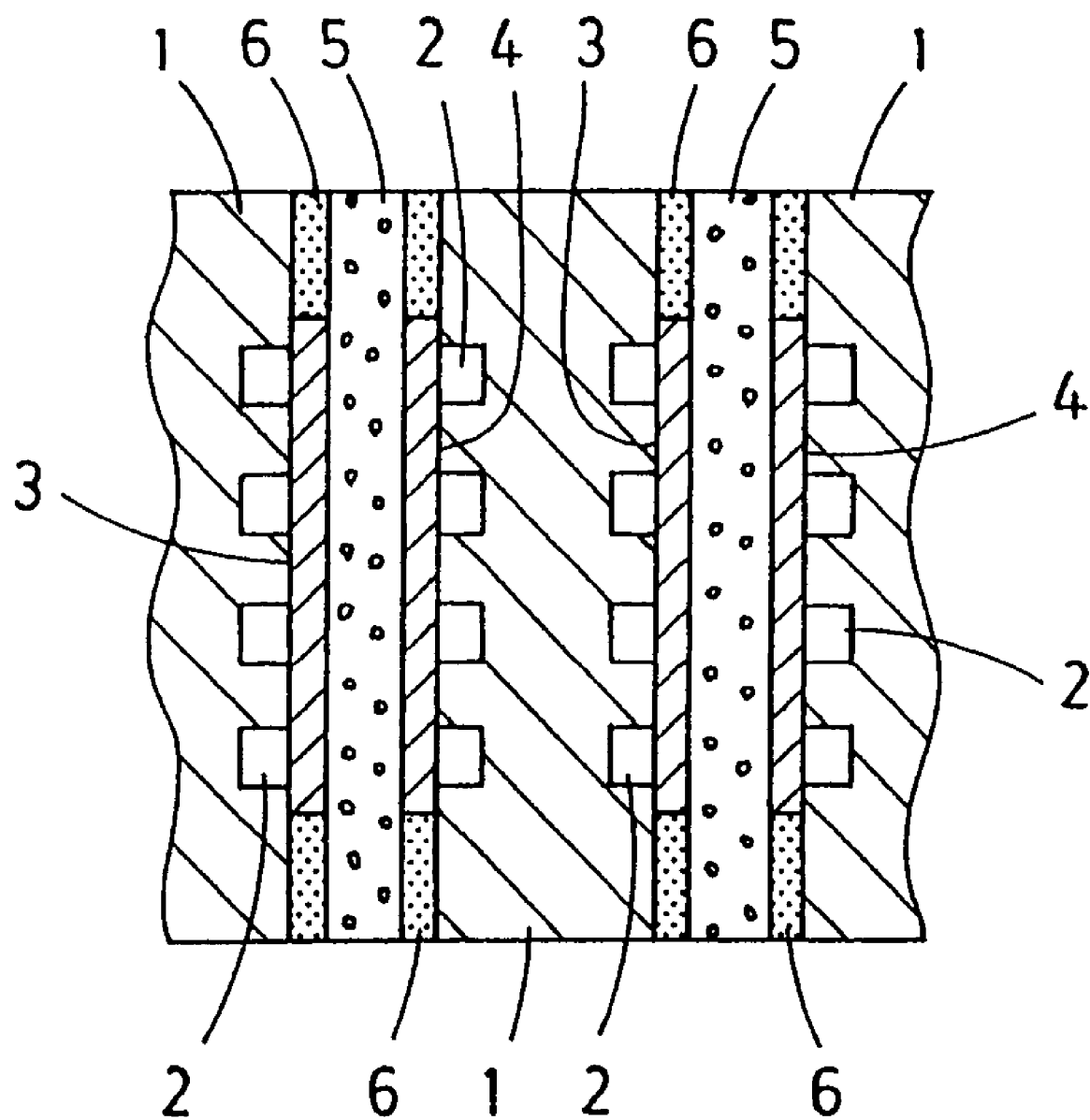
FIG. 1 is a partial cross-sectional view showing a schematic structure of a polymer electrolyte fuel cell.

A polymer electrolyte fuel cell separator material according to the present invention includes a graphite/cured resin molded product produced by integrally binding a graphite powder using a mixed resin as a binder, the mixed resin being prepared by mixing a phenol novolac epoxy resin or a cresol novolac epoxy resin, a novolac phenolic resin as a curing agent, and an imidazole compound as a curing accelerator, and the graphite/cured resin molded product being molded into a plate with a thickness of about 1 to 3 mm, in which a number of grooves with a depth of 0.5 to 1 mm are formed in both sides or one side as fuel gas/oxidant gas channels.

The epoxy equivalent of the epoxy resin is set at 170 to 250 g/eq. If the epoxy equivalent is less than 170 g/eq, the cured resin molded product absorbs water and moisture due to residual unreacted epoxy groups, whereby the amount of swelling is increased. If the epoxy equivalent exceeds 250 g/eq, high-temperature strength and heat resistance are decreased.

The hydroxyl equivalent of the novolac phenolic resin affects the properties of the cured resin molded product and the releasability of the cured resin molded product during molding. The hydroxyl equivalent is set at 120 to 200 g/eq. If the hydroxyl equivalent exceeds 200 g/eq, the heat resistance and the high-temperature strength of the cured resin molded product are decreased. If the hydroxyl equivalent is less than 120 g/eq, the texture of the cured resin molded product becomes nonuniform due to moisture absorption of the resin, whereby gas impermeability is decreased. Moreover, an increase in water absorption elongation percentage and deterioration in releasability occur.

The mixing ratio of the epoxy resin and the phenolic resin is set so that the equivalent ratio by weight of epoxy groups to phenolic hydroxyl groups is 0.5 to 1.5. If the equivalent ratio is less than 0.5 or exceeds 1.5, the bonding reaction between the epoxy resin and the phenolic resin does not sufficiently proceed, whereby the moisture resistance and the heat resistance of the cured resin molded product are decreased. Moreover, the amount of TOC dissolved is increased.

A mixed resin prepared by adding 0.001 to 2.0 wt % of an imidazole compound without an amino group as a curing accelerator to the mixture of the epoxy resin and the phenolic resin is used as the binder. When using an imidazole compound having an amino group as the curing accelerator, unreacted amino groups remain in the cured resin molded product and are dissolved into the cell as ammonium ions during cell operation to hinder the movement of protons in the electrolyte membrane or decrease the catalytic function of the electrode, thereby causing the cell performance to deteriorate. If the amount of the imidazole compound is less than 0.001 wt %, the imidazole compound cannot sufficiently function as the curing accelerator. If the amount of the imidazole compound exceeds 2.0 wt %, moldability deteriorates due to an increase in the rate of curing reaction, whereby gas impermeability and strength are decreased.

As the graphite powder, artificial graphite, natural graphite, expanded graphite, a mixture thereof, or the like is used. A graphite powder is used of which the grain size is adjusted by grinding graphite using an appropriate grinder and sieving out the ground graphite particles. In order to prevent removal of the graphite powder particles and occurrence of interparticle cracks when forming the gas grooves in the separator, it is preferable to adjust the grain size of the graphite powder to an average particle diameter of 50 μm or less and a maximum particle diameter of 100 μm or less.

The polymer electrolyte fuel cell separator material according to the present invention is formed of the graphite/cured resin molded product produced by integrally binding the graphite powder using the above mixed resin, and has, when immersed in hot water at 90° C., (1) a water absorption elongation percentage after 500 hours of immersion of 0.10% or less, (2) an amount of ammonium ions dissolved after 50 hours of immersion of 2 μg/g or less, and (3) an amount of total organic carbon (TOC) dissolved after 50 hours of immersion of 50 μg/g or less.

The polymer electrolyte fuel cell separator material according to the present invention is formed by integrally binding the graphite powder using the above mixed resin. Since the amount of swelling of the graphite/cured resin molded product due to water absorption can be reduced by using the above mixed resin as the binder, elongation due to water absorption during cell operation or elongation with time due to moisture absorption in air can be reduced.

Specifically, the separator material has (1) a water absorption elongation percentage after 500 hours of immersion in hot water at 90° C., which simulates the fuel cell operation environment, of 0.10% or less. If the elongation percentage is 0.10% or less, it is possible to suppress warping of the separator due to water absorption or occurrence of cracks due to nonuniform elongation caused by water absorption in the separator, whereby breakage of the separator can be prevented. The elongation percentage is measured from a change in length or width when immersing the separator material in hot water at 90° C. for 500 hours. For example, the elongation percentage is calculated by elongation percentage=[(length after immersion−length before immersion)/(length before immersion)]×100.

Since the mixed resin prepared by mixing the phenol novolac epoxy resin or the cresol novolac epoxy resin, the novolac phenolic resin as the curing agent, and the imidazole compound without an amino group as the curing accelerator is used as the binder, production of ammonia and organic carbon during curing is suppressed in comparison with the case of using only a novolac phenolic resin as the binder, whereby the amounts of these components in the graphite/cured resin molded product are significantly reduced. This suppresses a phenomenon in which these components are dissolved into the cell during cell operation to hinder the movement of protons in the polymer membrane or cause the catalytic function of the electrode to deteriorate. Moreover, since water is not produced during the curing reaction, formation of holes in the texture due to evaporation of water is suppressed, whereby the separator material can be provided with high gas impermeability.

Specifically, deterioration in cell performance such as a decrease in voltage or output can be effectively prevented by reducing (2) the amount of ammonium ions dissolved to 2 μg/g or less and (3) the amount of total organic carbon (TOC) dissolved to 50 μg/g or less after 50 hours of immersion in hot water at 90° C. which simulates the cell operation environment. The amount of ammonium ions is measured by ion chromatography, and the amount of total organic carbon (TOC) is measured using a TOC analyzer (JIS K0805).

The weight ratio of the resin solid content of the mixed resin and the graphite powder of the graphite/cured resin molded product forming the polymer electrolyte fuel cell separator material according to the present invention is preferably set at 10:90 to 35:65. If the weight ratio is set so that the resin solid content is less than 10 wt % and the graphite powder exceeds 90 wt %, flowability during molding is decreased due to a low resin content, whereby the texture of the molded product becomes nonuniform. If the weight ratio is set so that the resin solid content exceeds 35 wt % and the graphite powder is less than 65 wt %, the cell performance deteriorates due to an increase in electric resistance.

A method of producing a polymer electrolyte fuel cell separator material according to the present invention includes mixing a phenol novolac epoxy resin or a cresol novolac epoxy resin having an epoxy equivalent of 170 to 250 g/eq and a novolac phenolic resin having a hydroxyl equivalent of 120 to 200 g/eq so that an equivalent ratio by weight of epoxy groups to phenolic hydroxyl groups is 0.5 to 1.5, adding an imidazole compound without an amino group to the mixture in an amount of 0.001 to 2.0 wt %, dissolving the mixture in an organic solvent, kneading the mixed resin solution and graphite powder, removing the organic solvent by volatilization, grinding the kneaded product to obtain a molding powder, filling a preforming mold with the molding powder, providing an upper mold and preforming the molding powder at a pressure of 1 to 10 MPa to obtain a preform, inserting the preform into a mold, and thermocompression-molding the preform at a pressure of 20 to 50 MPa and a temperature of 150 to 250° C.

The epoxy equivalent of the phenol novolac epoxy resin or the cresol novolac epoxy resin used in the present invention is set at 170 to 250 g/eq. If the epoxy equivalent is less than 170 g/eq, the cured resin molded product absorbs water and moisture due to residual unreacted epoxy groups, whereby the amount of swelling is increased. If the epoxy equivalent exceeds 250 g/eq, high-temperature strength and heat resistance are decreased. The hydroxyl equivalent of the novolac phenolic resin is set at 120 to 200 g/eq. If the hydroxyl equivalent exceeds 200 g/eq, the heat resistance and the high-temperature strength of the cured resin molded product are decreased. If the hydroxyl equivalent is less than 120 g/eq, the texture of the cured resin molded product becomes nonuniform due to moisture absorption of the resin, whereby gas impermeability is decreased. Moreover, an increase in water absorption elongation percentage and deterioration in releasability occur.

The epoxy resin and the phenolic resin are mixed so that the equivalent ratio by weight of epoxy groups to phenolic hydroxyl groups ((epoxy equivalent of epoxy resin)/(hydroxyl equivalent of phenolic resin)) is 0.5 to 1.5, and preferably 0.9 to 1.3. If the equivalent ratio is less than 0.5 or exceeds 1.5, the bonding reaction between the epoxy resin and the phenolic resin does not sufficiently proceed, whereby the moisture resistance and the heat resistance of the cured resin molded product are decreased. Moreover, the amount of TOC dissolved is increased. The epoxy equivalent is measured by a perchloric acid titration method in accordance with JIS K7236, and the phenolic hydroxyl equivalent is measured by an acetylation method in accordance with JIS K0070.

The imidazole compound without an amino group is used as the curing accelerator. When using an imidazole compound having an amino group as the curing accelerator, unreacted amino groups remain in the cured resin molded product and are dissolved into the cell as ammonium ions during cell operation, thereby causing the cell performance to deteriorate, as described above.

As examples of the imidazole compound without an amino group, 2-methylimidazole, 2-phenylimidazole, 2-ethyl-4-methylimidazole, 2-undecylimidazole, 1-benzyl-2-methylimidazole, and the like can be given. These compounds are used either individually or in combination of two or more.

The imidazole compound without an amino group is added to the mixture prepared by mixing the phenol novolac epoxy resin or the cresol novolac epoxy resin and the novolac phenolic resin at a specific epoxy group/phenolic hydroxyl group equivalent ratio in an amount of 0.001 to 2.0 wt %, and the resulting mixture is dissolved in an organic solvent such as an alcohol, ether, or ketone to prepare a mixed resin solution. If the amount of the imidazole compound is less than 0.001 wt %, the imidazole compound cannot sufficiently function as the curing accelerator. If the amount of the imidazole compound exceeds 2.0 wt %, moldability deteriorates due to an increase in the rate of curing reaction, whereby gas impermeability and strength are decreased.

The mixed resin solution and the graphite powder are mixed and uniformly kneaded. In this case, the weight ratio of the resin solid content of the mixed resin and the graphite powder is preferably adjusted to 10:90 to 35:65. If the weight ratio is set so that the resin solid content is less than 10 wt % and the graphite powder exceeds 90 wt %, flowability during molding is decreased due to a low resin content, whereby the texture of the molded product becomes nonuniform. If the weight ratio is set so that the resin solid content exceeds 35 wt % and the graphite powder is less than 65 wt %, the cell performance deteriorates due to an increase in electric resistance.

The mixed resin solution and the graphite powder are mixed and sufficiently kneaded using an appropriate mixer such as a kneader, a pressuring kneader, or a twin-screw mixer to prepare a uniform kneaded product. After kneading, the organic solvent is removed by volatilization from the kneaded product by means of vacuum drying or air drying. It is preferable to adjust the grain size of the graphite powder to an average particle diameter of 50 μm or less and a maximum particle diameter of 100 μm or less.

Since the surface of the kneaded product is covered with the resin film and exhibits low conductivity, the kneaded product is ground in order to prevent a decrease in conductivity by exposing the graphite portion. The kneaded product is ground to a particle diameter of about 0.1 to 1 mm in order to uniformly fill the preforming mold to obtain a molding powder. The anisotropy of the material properties can be suppressed by grinding the kneaded product. Specifically, the electric resistance of the plate-shaped molded product used as the separator in the thickness direction can be reduced to suppress the anisotropy with the electric resistance in the plane direction.

The cavity of the preforming mold is uniformly filled with the molding powder. After providing the upper mold heated at a temperature equal to or greater than the melting point of the resin such as the melting point of the resin plus about 10° C., the molding powder is preformed at a pressure of 1 to 10 MPa to obtain a plate-shaped preform.

After applying a release agent to the mold provided with depressions/protrusions for forming grooves used as separator gas passages, the plate-shaped preform is inserted into the mold and thermocompression-molded at a pressure of 20 to 50 MPa and a temperature of 150 to 250° C. to cure the resin to obtain a separator material formed of a graphite/cured resin molded product in which the graphite powder is integrally bound with the cured resin. The separator material thus produced is optionally machined.

EXAMPLES

The present invention is described below in detail by way of examples and comparative examples.

Examples 1 to 6 and Comparative Examples 1 to 8

Phenol novolac epoxy resins with different epoxy equivalents and novolac phenolic resins with different hydroxyl equivalents were respectively mixed at different weight ratios to prepare resin mixtures with different epoxy group/phenolic hydroxyl group equivalent ratios. After dissolving each resin mixture was dissolved in methyl ethyl ketone so that the resin solid content was 70 wt %, 2-ethyl-4-methylimidazole was added to the resin solution as a curing accelerator.

The mixed resin solution and a graphite powder were mixed so that the weight ratio of the resin solid content and the graphite powder was 20:80, and kneaded for one hour in a kneader. As the graphite powder, artificial graphite powder was used of which the grain size was adjusted to an average particle diameter of 40 μm and a maximum particle diameter of 80 μm or less. The kneaded product was air-dried at room temperature for 24 hours, and vacuum-dried to remove methyl ethyl ketone by volatilization. After grinding the kneaded product, the grain size was adjusted to obtain a molding powder with a particle diameter of 0.1 to 0.5 mm.

A preforming mold was uniformly filled with the molding powder. After providing an upper mold heated at 70° C., the molding powder was preformed at a pressure of 3 MPa for 10 seconds to obtain a plate-shaped preform.

After applying a fluorine-based release agent to a mold with outer dimensions of 270×270 mm in which a groove shape with a width of 1 mm and a depth of 0.6 mm was formed within the range of 200×200 mm, the preform was inserted into the mold and thermocompression-molded at a pressure of 40 MPa and a temperature of 180° C. A separator material (200×200 mm, minimum thickness: 0.45 mm) was thus produced which was formed of a graphite/cured resin molded product in which the graphite powder was bound with the cured resin and in which grooves with a width of 1 mm and a depth of 0.6 mm were formed as gas passages.

Comparative Example 9

A separator material was produced in the same manner as in Example 1 except for adding 1.0 wt % of 2-methylimidazoleazine as the curing accelerator.

Comparative Example 10

A separator material was produced in the same manner as described above except for mixing 90 wt % of a novolac phenolic resin and 10 wt % of hexamine.

A test piece (6×30 mm) cut from the separator material was immersed in 50 ml of distilled water in an airtight container and held in a thermostatic bath at 90° C. The ammonium ion concentration and the total organic carbon (TOC) concentration after holding the test piece for 50 hours were measured, and the amount of ammonium ions dissolved and the amount of total organic carbon (TOC) dissolved were calculated.

After immersing the test piece in 50 ml of distilled water in an airtight container and holding the test piece in a thermostatic bath at 90° C. for 500 hours, a change in length was measured to calculate the water absorption elongation percentage.

The properties of the test piece were measured according to the following methods.

(1) Flexural strength (MPa)

The flexural strength was measured at room temperature and 90° C. in accordance with JIS R1601.

(2) Resistivity (mohm·cm)

The resistivity was measured in accordance with JIS C2525.

(3) Contact resistance (mohm·cm$^2$)

The contact resistance was measured at 1 A while contacting the test pieces at a pressure of 1 MPa.

(4) Gas permeation coefficient (mol·m·m$^{-2}$·sec$^{-1}$·MPa$^{-1}$)

The amount of gas permeated per unit time and unit cross-sectional area when applying a differential pressure of 0.2 MPa using nitrogen gas was measured.

The results are shown in Tables 1 and 2 together with the production conditions.

TABLE 1

| | | Example | | | | | | Comparative Example | |
|---|---|---|---|---|---|---|---|---|---|
| | | 1 | 2 | 3 | 4 | 5 | 6 | 1 | 2 |
| Production conditions | Epoxy resin (wt %) | 61 | 67 | 56 | 61.5 | 53 | 65 | 71 | 40 |
| | Epoxy equivalent (g/eq) | 200 | 200 | 200 | 200 | 200 | 240 | 200 | 200 |
| | Phenolic resin (wt %) | 38 | 32 | 43 | *1 | 46 | 34 | 28 | 59 |
| | Hydroxyl equivalent (g/eq) | 125 | 125 | 125 | 125 | 170 | 125 | 125 | 125 |
| | Equivalent ratio | 1.0 | 1.3 | 0.8 | 1.0 | 1.0 | 1.0 | 1.6 | 0.4 |
| | Curing accelerator (wt %) | 1 | 1 | 1 | 0.01 | 1 | 1 | 1 | 1 |
| Material properties | Amount of NH$_4^+$ dissolved (μg/g) | <2 | <2 | <2 | <2 | <2 | <2 | <2 | <2 |
| | Amount of TOC dissolved (μg/g) | 40 | 35 | 41 | 38 | 44 | 46 | 115 | 120 |
| | Elongation percentage (%) | 0.05 | 0.08 | 0.07 | 0.06 | 0.04 | 0.04 | 0.25 | 0.22 |
| | Flexural strength at room temperature (MPa) | 57 | 55 | 54 | 54 | 52 | 55 | 39 | 35 |
| | Flexural strength at 80° C. (MPa) | 55 | 52 | 53 | 52 | 50 | 54 | 38 | 32 |
| | Resistivity (mΩ·cm) | 6.1 | 6.5 | 6.5 | 6.4 | 7.1 | 6.9 | 8.6 | 10.2 |
| | Contact resistance (mΩ·cm$^2$) | 5.6 | 6.2 | 6.0 | 5.9 | 6.5 | 7.0 | 7.8 | 9.5 |
| | Gas permeation coefficient (× 10$^{-12}$ mol·m·m$^{-2}$·sec$^{-1}$·Mpa$^{-1}$) | 2.3 | 1.5 | 2.0 | 2.5 | 2.2 | 2.8 | 15 | 32 |
| | Appearance of molded product | Good | Good | Good | Good | Good | Good | Bad | Bad |

*1 38.49

TABLE 2

| | | Comparative Example | | | | | | | |
|---|---|---|---|---|---|---|---|---|---|
| | | 3 | 4 | 5 | 6 | 7 | 8 | 9 | 10 |
| Production conditions | Epoxy resin (wt %) | 61 | 60 | 67 | 56 | 66 | 47 | 61 | — |
| | Epoxy equivalent (g/eq) | 200 | 200 | 260 | 160 | 200 | 200 | 200 | — |
| | Phenolic resin (wt %) | 39 | 37 | 32 | 43 | 33 | 52 | 38 | 90 |
| | Hydroxyl equivalent (g/eq) | 125 | 125 | 125 | 125 | 100 | 220 | 125 | *3 |
| | Equivalent ratio | 1.0 | 1.0 | 1.0 | 1.0 | 1.0 | 1.0 | 1.0 | — |
| | Curing accelerator (wt %) | 0 | 3 | 1 | 1 | 1 | 1 | *2 | — |
| Material properties | Amount of NH$_4^+$ dissolved (μg/g) | <2 | <2 | <2 | <2 | <2 | <2 | 24 | 20 |
| | Amount of TOC dissolved (μg/g) | 100 | 65 | 49 | 48 | 40 | 46 | 43 | 90 |
| | Elongation percentage (%) | 0.2 | 0.09 | 0.04 | 0.12 | 0.11 | 0.04 | 0.06 | 0.29 |
| | Flexural strength at room temperature (MPa) | 53 | 48 | 50 | 52 | 54 | 51 | 55 | 56 |

TABLE 2-continued

|  | Comparative Example | | | | | | | |
| --- | --- | --- | --- | --- | --- | --- | --- | --- |
|  | 3 | 4 | 5 | 6 | 7 | 8 | 9 | 10 |
| Flexural strength at 80° C. (MPa) | 26 | 45 | 31 | 51 | 51 | 29 | 50 | 47 |
| Resistivity (mΩ · cm) | 7.0 | 7.8 | 6.5 | 7.0 | 6.8 | 6.4 | 6.2 | 8.2 |
| Contact resistance (mΩ · cm$^2$) | 6.5 | 8.1 | 6.0 | 6.3 | 6.4 | 6.6 | 6.6 | 4.6 |
| Gas permeation coefficient ($\times 10^{-12}$ mol · m · m$^{-2}$ · sec$^{-1}$ · Mpa$^{-1}$) | 11.3 | 10.2 | 3.1 | 3.5 | 9.8 | 2.8 | 3.1 | 6.5 |
| Appearance of molded product | Good | Bad | Good | Good | Good | Good | Good | Good |

*2 1 wt % of 2-methylimidazoleazine was added.
*3 Hexamine was used as the curing agent (10 wt %).

As is clear from the results shown in Tables 1 and 2, the separator materials of Examples 1 to 6 exhibiting a low water absorption elongation percentage, a small amount of ammonium ions dissolved, and a small amount of TOC dissolved when immersed in hot water at 90° C. exhibited an excellent flexural strength, resistivity, gas permeation coefficient, and the like. In Comparative Examples 1 and 2 in which the equivalent ratio of epoxy groups of the phenol novolac epoxy resin to hydroxyl groups of the novolac phenolic resin is large or small, since the reaction between the epoxy resin and the phenolic resin did not sufficiently proceed, the separator materials exhibited a high water absorption elongation percentage, a large amount of TOC dissolved and exhibited inferior flexural strength, resistivity, gas permeation coefficient, and the like.

In Comparative Example 3 in which the curing accelerator was not used, the separator material exhibited low high-temperature strength, high water absorption elongation percentage, and inferior gas impermeability due to insufficient curing reaction. In Comparative Example 4 in which a large amount of curing accelerator was added, moldability deteriorated due to an increase in the rate of curing reaction, whereby the separator material exhibited a high gas permeation coefficient and decreased flexural strength.

In Comparative Examples 5 to 8 in which the epoxy equivalent or the phenolic hydroxyl equivalent was outside the range of the present invention, the separator materials exhibited inferior high-temperature strength, water absorption elongation percentage, and the like.

In Comparative Example 9 in which 2-methylimidazoleazine (imidazole compound having amino group) was used as the curing accelerator, or Comparative Example 10 in which hexamine was used as the curing agent, the amount of ammonium ions (which cause the cell performance to deteriorate) dissolved was increased, thereby resulting in production of an inferior polymer electrolyte fuel cell separator material.

INDUSTRIAL APPLICABILITY

The polymer electrolyte fuel cell separator material according to the present invention ensures excellent cell performance, exhibits only a small decrease in output after long-term power generation, and enables stable power generation, since the separator material is formed of a graphite/cured resin molded product which is produced using a mixed resin as a binder resin for graphite powder, the mixed resin being prepared by using a phenol novolac epoxy resin or a cresol novolac epoxy resin with a specific epoxy equivalent and a novolac phenolic resin (curing agent) with a specific hydroxyl equivalent at a specific equivalent ratio of epoxy groups to phenolic hydroxyl groups, and adding a specific amount of an imidazole compound without an amino group as a curing accelerator, and which exhibits a small water absorption elongation percentage, a small amount of ammonium ions dissolved, and a small amount of total organic carbon (TOC) dissolved.

The above separator material can be produced by filling a preforming mold with a molding powder obtained by grinding a kneaded product of a graphite powder and the above mixed resin, providing an upper mold and preforming the molding powder at a pressure of 1 to 10 MPa to obtain a preform, inserting the preform into a mold, and thermocompression-molding the preform at a pressure of 20 to 50 MPa and a temperature of 150 to 250° C.

The invention claimed is:

1. A polymer electrolyte fuel cell separator material comprising a graphite/cured resin molded product produced by binding a graphite powder using a mixed resin as a binder, the mixed resin being prepared by forming a mixture of at least one of a phenol novolac epoxy resin and a cresol novolac epoxy resin having an epoxy equivalent of 170 to 250 g/eq and a novolac phenolic resin having a hydroxyl equivalent of 120 to 200 g/eq so that an equivalent ratio by weight of epoxy groups to phenolic hydroxyl groups is 0.5 to 1.5, and adding an imidazole compound without an amino group to the mixture as a curing accelerator in an amount of 0.001 to 2.0 wt %, the separator material having, when immersed in hot water at 90° C., (1) a water absorption elongation percentage after 500 hours of immersion of 0.10% or less, (2) an amount of ammonium ions dissolved after 50 hours of immersion of 2 μg/g or less, and (3) an amount of total organic carbon (TOC) dissolved after 50 hours of immersion of 50 μg/g or less.

2. The polymer electrolyte fuel cell separator material according to claim 1, wherein a weight ratio of a resin solid content of the mixed resin and the graphite powder is 10:90 to 35:65.

3. A method of producing a polymer electrolyte fuel cell separator material comprising mixing a phenol novolac epoxy resin or a cresol novolac epoxy resin having an epoxy equivalent of 170 to 250 g/eq and a novolac phenolic resin having a hydroxyl equivalent of 120 to 200 g/eq so that an equivalent ratio by weight of epoxy groups to phenolic hydroxyl groups is 0.5 to 1.5, adding an imidazole compound without an amino group to the mixture in an amount of 0.001 to 2.0 wt %, dissolving the resulting mixture in an organic solvent, kneading the mixed resin solution and a graphite powder, removing the organic solvent by volatilization, grinding the kneaded product to obtain a molding powder, filling a preforming mold with the molding powder, providing an upper mold and preforming the molding powder at a pressure of 1 to 10 MPa to obtain a preform, inserting the preform into a mold, and thermocompression-molding the preform at a pressure of 20 to 50 MPa and a temperature of 150 to 250° C.

4. The method of producing a polymer electrolyte fuel cell separator material according to claim 3, wherein a weight ratio of a resin solid content of the mixed resin and the graphite powder is 10:90 to 35:65.

* * * * *